US012730239B2

(12) United States Patent
Cheng et al.

(10) Patent No.: US 12,730,239 B2
(45) Date of Patent: Sep. 8, 2026

(54) METHODS AND SYSTEMS FOR SEISMIC IMAGING

(71) Applicant: Schlumberger Technology Corporation, Sugar Land, TX (US)

(72) Inventors: Xin Cheng, Katy, TX (US); Zongcai Feng, Houston, TX (US); Gaurav Dutta, Houston, TX (US); Jian Mao, Houston, TX (US); Denes Vigh, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 62 days.

(21) Appl. No.: 19/016,529

(22) Filed: Jan. 10, 2025

(65) Prior Publication Data

US 2025/0306224 A1 Oct. 2, 2025

Related U.S. Application Data

(60) Provisional application No. 63/620,342, filed on Jan. 12, 2024.

(51) Int. Cl.
*G01V 1/30* (2006.01)
*G01V 1/28* (2006.01)
*G01V 1/34* (2006.01)

(52) U.S. Cl.
CPC .............. *G01V 1/282* (2013.01); *G01V 1/301* (2013.01); *G01V 1/303* (2013.01); *G01V 1/306* (2013.01);

(Continued)

(58) Field of Classification Search
CPC ........ G01V 1/282; G01V 1/301; G01V 1/303; G01V 2210/6161
See application file for complete search history.

(56) References Cited

U.S. PATENT DOCUMENTS

| | | | | |
|---|---|---|---|---|
| 7,480,206 B2 | 1/2009 | Hill | | |
| 2013/0238249 A1* | 9/2013 | Xu | ........................ | G01V 1/3808 702/18 |

(Continued)

OTHER PUBLICATIONS

Bai, B. et al., "Turning high resolution FWI model into pseudo-reflectivity: A case study using sparse OBN", SEG Technical Program Expanded Abstracts, 2022, pp. 787-791.

(Continued)

*Primary Examiner* — Ricky Go
(74) *Attorney, Agent, or Firm* — Kyle R. Miiller

(57) ABSTRACT

A method for producing a high-fidelity, high-resolution seismic image of a subsurface of a wellsite. The method includes receiving seismic data from wellsite equipment that is disposed at a wellsite. An initial estimation of an earth model is recovered from the received data and a depth migration workflow is performed that is based on the initial estimation of the earth model. The depth migration workflow may be a least-squares FWI-derived reflectively (LS-FDR) workflow. The method also includes revising the initial estimation of the earth model based on the results of the depth migration workflow in order to produce an optimal estimation of the earth model. A seismic image may then be generated from the optimal estimation of the earth model and displayed on a screen for a user. The user may then perform a wellsite action that is based on the generated seismic image.

14 Claims, 14 Drawing Sheets

(52) U.S. Cl.
CPC ...... *G01V 1/345* (2013.01); *G01V 2210/6161* (2013.01)

(56) References Cited

U.S. PATENT DOCUMENTS

| | | | | |
|---|---|---|---|---|
| 2017/0285194 | A1 | 10/2017 | Park et al. | |
| 2019/0302293 | A1* | 10/2019 | Zhang | G01V 1/282 |
| 2020/0003920 | A1* | 1/2020 | Tang | G01V 1/30 |
| 2020/0183031 | A1 | 6/2020 | Denli | |
| 2021/0223424 | A1* | 7/2021 | Valensi | G01V 1/303 |
| 2021/0255349 | A1 | 8/2021 | Zhou et al. | |
| 2024/0192390 | A1* | 6/2024 | Shan | G01V 1/282 |

OTHER PUBLICATIONS

Cheng, X. et al., "Enhanced template matching full-waveform inversion", 84th EAGE Annual Conference & Exhibition, Extended Abstracts, Jun. 2023, pp. 1-5, vol. 2023.
Shuey, R. T., "A simplification of the Zoeppritz equations", Geophysics, Apr. 1985, 50, pp. 609-614.
Sirgue, L. et al., ""Efficient waveform inversion and imaging: A strategy for selecting temporal frequencies"", Geophysics, Jan. 2004, 69, pp. 231-248.
Vigh D. et al., "Forge ahead in acquisition and model building via full-waveform inversion: Gulf of Mexico case study", Geophysics, Sep. 1, 2023, 88, 5, pp. 285-295.
Wang, B. et al., "Inversion-based imaging: from LSRTM to FWI imaging", First Break, Dec. 1, 2021, 39, pp. 85-93.
Zhou, H.W. et al., "Reverse time migration: A prospect of seismic imaging methodology", Earth-Science Reviews, Feb. 24, 2018, pp. 207-227, vol. 179.

* cited by examiner

METHODS AND SYSTEMS FOR SEISMIC IMAGING

CROSS-REFERENCE TO RELATED APPLICATIONS

This patent application claims priority to U.S. Provisional Application No. 63/620,342, filed on Jan. 12, 2024, which is incorporated by reference herein in its entirety.

BACKGROUND

Well borehole images provide valuable information for constructing reservoir models and for operations in the oil and gas industry. These images contain valuable information that reflects various processes that have occurred ranging from formation deposition until image acquisition. The unique textural assemblage observed in each field, reservoir, well, and depth interval is a result of their specific depositional facies, diagenetic processes, geomechanics, and wellbore conditions or interventions. Understanding these textures can provide insights into the history of the reservoir and aid in operation resource management and improve production efficiency. Additionally, high resolution seismic images may be used to overcome problems with the present state of technology that are time-consuming, subjective, and prone to errors.

SUMMARY

A method is provided for producing a high-fidelity, high-resolution seismic image of a subsurface of a wellsite. In certain embodiments, the method includes receiving seismic data from wellsite equipment disposed at a wellsite. The method may include recovering an initial estimation of an earth model from the received data. The method may also include performing a depth migration workflow that is based on the initial estimation of the earth model. In certain embodiments, the depth migration workflow may be a least-squares FWI-derived reflectively (LS-FDR) workflow. The LS-FDR workflow itself may further include utilizing a primary-only wavefield, multiple wavefields, or a combination thereof. According to certain embodiments, the method includes revising the initial estimation of the earth model based on the results of the depth migration workflow to produce an optimal estimation of the earth model. In certain embodiments, the initial estimation of the earth model is revised repeatedly using the LS-FDR workflow. The method also includes generating a seismic image from the optimal estimation of the earth model. According to certain embodiments, the method may include displaying the generated seismic image on a screen. Additionally, the method includes performing a wellsite action based on the generated seismic image. In certain embodiments, performing the wellsite action includes generating or transmitting a signal that instructs or causes an action to occur, wherein the action comprises a physical action, and wherein the physical action comprises selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, deciding to stop drilling and pull the downhole equipment up before causing a twist-off, or a combination thereof.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the present disclosure. The first object or step, and the second object or step, are both objects or steps, respectively, but they are not to be considered the same object or step.

The terminology used in the description of the present disclosure herein is for the purpose of describing particular embodiments and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all of the components of a wavefield, all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

Computing Systems

Figure 1A:
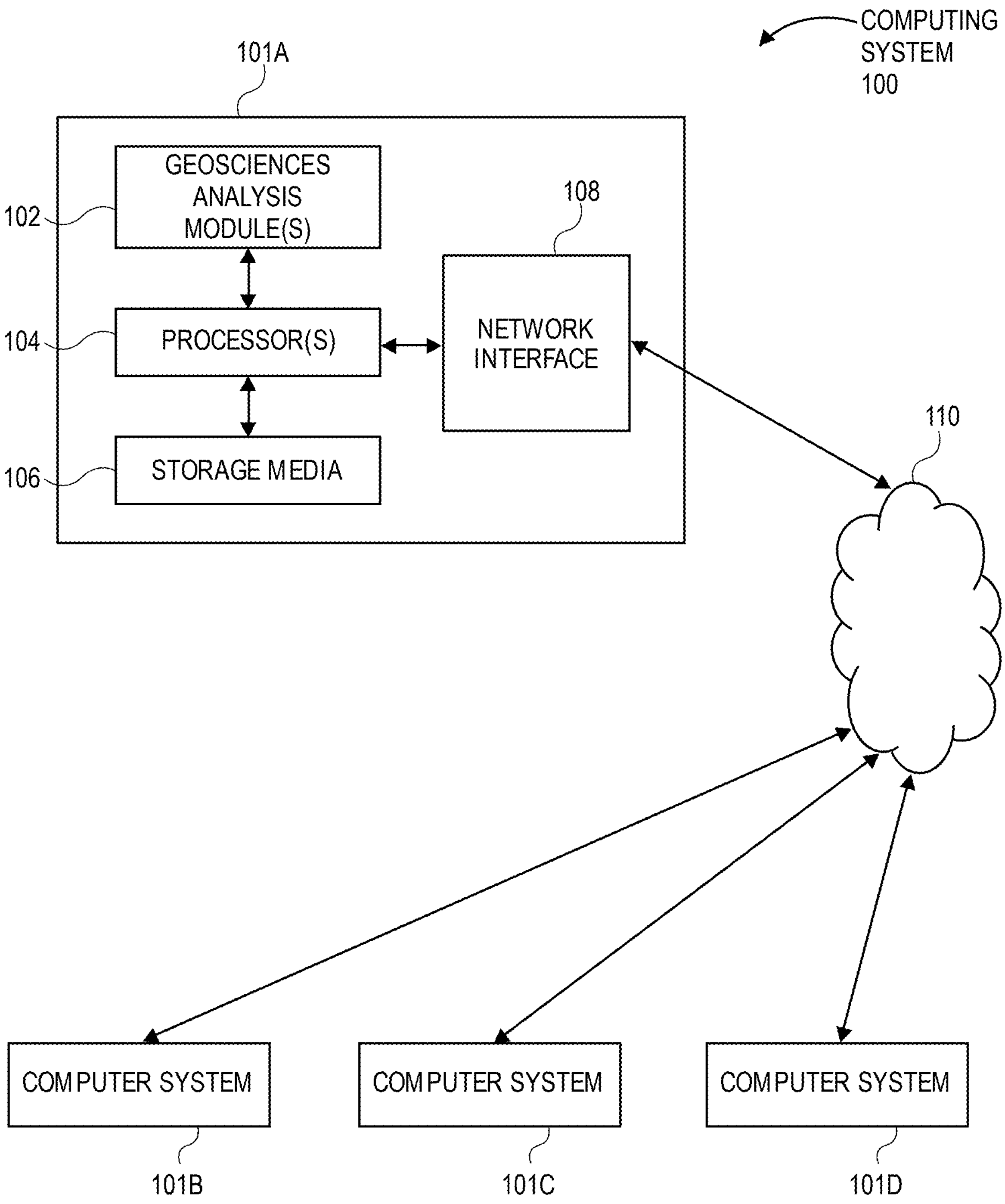
FIG. 1A illustrates an example computing system, according to an embodiment.

FIG. 1A depicts an example computing system 100 in accordance with some embodiments. The computing system 100 can be an individual computer system 101A or an arrangement of distributed computer systems. The computer system 101A includes one or more geosciences analysis modules 102 that are configured to perform various tasks according to some embodiments, such as one or more methods disclosed herein. To perform these various tasks, geosciences analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g., computer systems 101A and 101B may be on a ship underway on the ocean, while in communication with one or more computer systems such as 101C and/or 101D that are located in one or more data centers on shore, other ships, and/or located in varying countries on different continents). Note that data network 110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 1A storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 101A is one example of a computing system, and that computer system 101A may have more or fewer components than shown, may combine additional components not depicted in the example embodiment of FIG. 1A, and/or computer system 101A may have a different configuration or arrangement of the components depicted in FIG. 1A. The various components shown in FIG. 1A may be implemented in hardware, software, or a combination of both, hardware and software, including one or more signal processing and/or application specific integrated circuits.

It should also be appreciated that while no user input/output peripherals are illustrated with respect to computer systems 101A, 101B, 101C, and 101D, many embodiments of computing system 100 include computer systems with keyboards, mice, touch screens, displays, etc. Some computer systems in use in computing system 100 may be desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection.

FIGS. 1B-1E illustrate simplified, schematic views of oilfield having subterranean formation containing reservoir therein in accordance with implementations of various technologies and techniques described herein.

Figure 1B:
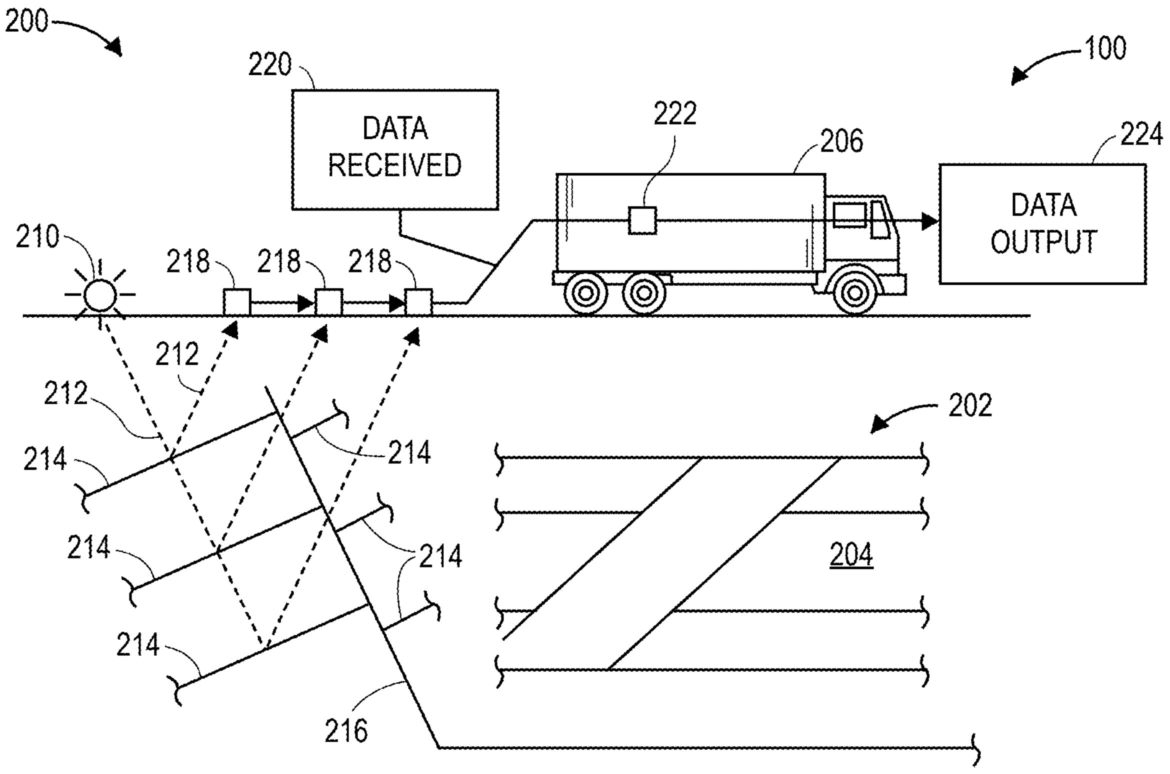
FIG. 1B illustrates a survey operation being performed by a survey tool, such as seismic truck, to measure properties of the subterranean formation, according to an embodiment.

FIG. 1B illustrates a survey operation being performed by a survey tool, such as seismic truck 206.1, to measure properties of the subterranean formation. The survey operation is a seismic survey operation for producing sound vibrations. In FIG. 1B, one such sound vibration, e.g., sound vibration 212 generated by source 210, reflects off horizons 214 in earth formation 216. A set of sound vibrations is received by sensors, such as geophone-receivers 218, situated on the earth's surface. The data received 220 is provided as input data to a computer 222.1 of a seismic truck 206.1, and responsive to the input data, computer 222.1 generates seismic data output 224. This seismic data output may be stored, transmitted or further processed as desired, for example, by data reduction.

Figure 1D:
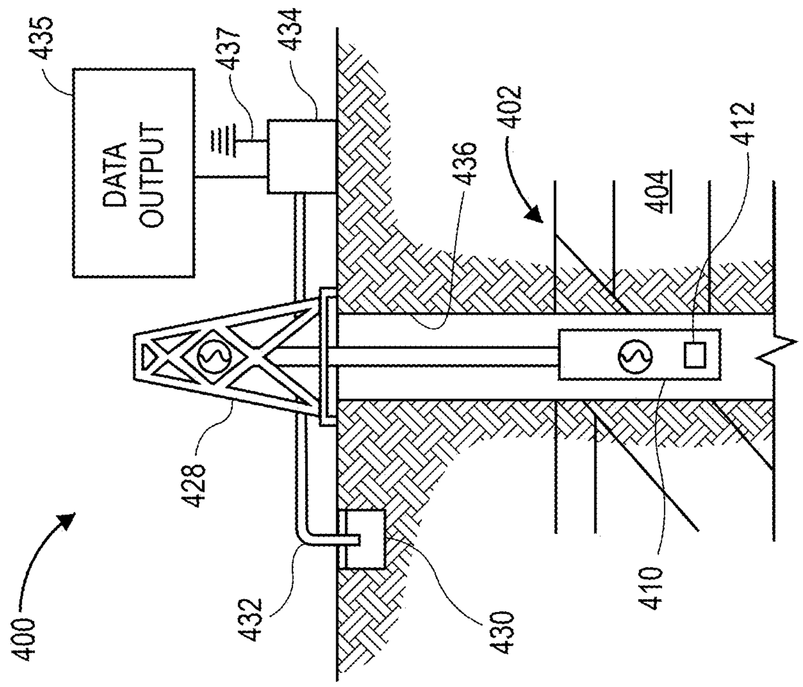
FIG. 1D illustrates a wireline operation being performed by a wireline tool suspended by a rig and into a wellbore, according to an embodiment.
Figure 1C:
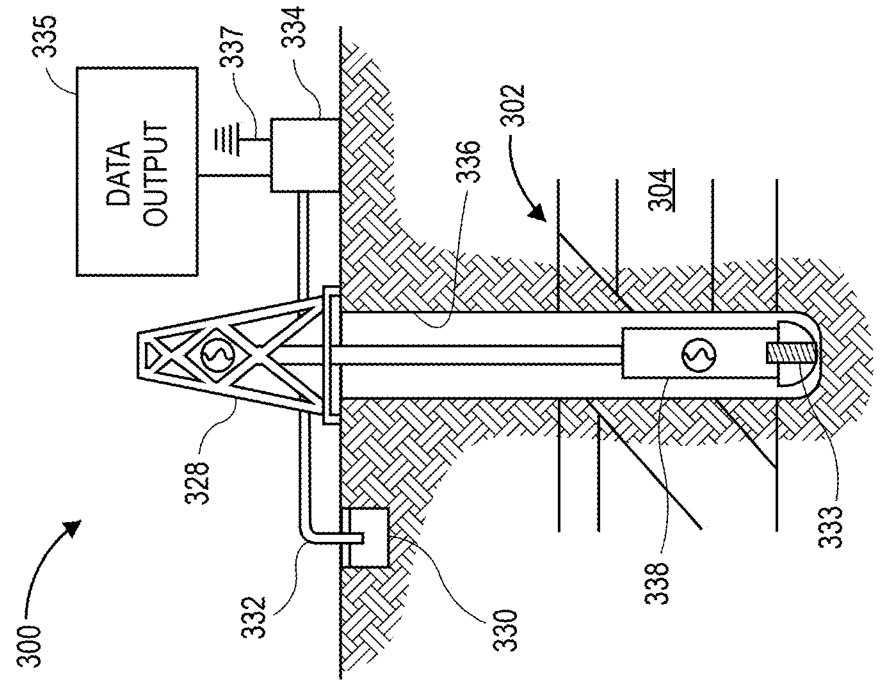
FIG. 1C illustrates a drilling operation being performed by drilling tools suspended by a rig and advanced into subterranean formations to form a wellbore, according to an embodiment.

FIG. 1C illustrates a drilling operation being performed by drilling tools 306.2 suspended by rig 328 and advanced into subterranean formations 302 to form wellbore 336. Mud pit 330 is used to draw drilling mud into the drilling tools via flow line 332 for circulating drilling mud down through the drilling tools, then up wellbore 336 and back to the surface. The drilling mud may be filtered and returned to the mud pit. A circulating system may be used for storing, controlling, or filtering the flowing drilling mud. The drilling tools are advanced into subterranean formations 302 to reach reservoir 304. Each well may target one or more reservoirs. The drilling tools are adapted for measuring downhole properties using logging while drilling tools. The logging while drilling tools may also be adapted for taking core sample 333 as shown.

Computer facilities may be positioned at various locations about the oilfield 300 (e.g., the surface unit 334) and/or at remote locations. Surface unit 334 may be used to communicate with the drilling tools and/or offsite operations, as well as with other surface or downhole sensors. Surface unit 334 is capable of communicating with the drilling tools to send commands to the drilling tools, and to receive data therefrom. Surface unit 334 may also collect data generated during the drilling operation and produce data output 335, which may then be stored or transmitted.

Sensors (S), such as gauges, may be positioned about oilfield 300 to collect data relating to various oilfield operations as described previously. As shown, sensor (S) is positioned in one or more locations in the drilling tools and/or at rig 328 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 306.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 334. The bottom hole assembly further includes drill collars for performing various other measurement functions.

The bottom hole assembly may include a communication subassembly that communicates with surface unit 334. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 334 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 334 may include transceiver 337 to allow communications between surface unit 334 and various portions of the oilfield 300 or other locations. Surface unit 334 may also be provided with or functionally connected to one or more controllers (not shown) for actuating mechanisms at oilfield 300. Surface unit 334 may then send command signals to oilfield 300 in response to data received. Surface unit 334 may receive commands via transceiver 337 or may itself execute commands to the controller. A processor may be provided to analyze the data (locally or remotely), make the decisions and/or actuate the controller. In this manner, oilfield 300 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1D illustrates a wireline operation being performed by wireline tool 406.3 suspended by rig 428 and into wellbore 336 of FIG. 1C. Wireline tool 406.3 is adapted for deployment into wellbore 436 for generating well logs, performing downhole tests and/or collecting samples. Wireline tool 406.3 may be used to provide another method and apparatus for performing a seismic survey operation. Wireline tool 406.3 may, for example, have an explosive, radioactive, electrical, or acoustic energy source 444 that sends and/or receives electrical signals to surrounding subterranean formations 402 and fluids therein.

Wireline tool 406.3 may be operatively connected to, for example, geophones 218 and a computer 222.1 of a seismic truck 206.1 of FIG. 1B. Wireline tool 406.3 may also provide data to surface unit 434. Surface unit 434 may collect data generated during the wireline operation and may produce data output 435 that may be stored or transmitted. Wireline tool 106.3 may be positioned at various depths in the wellbore 436 to provide a survey or other information relating to the subterranean formation 402.

Sensors (S), such as gauges, may be positioned about oilfield 400 to collect data relating to various field operations as described previously. As shown, sensor S is positioned in wireline tool 406.3 to measure downhole parameters which relate to, for example porosity, permeability, fluid composition and/or other parameters of the field operation.

Figure 1E:
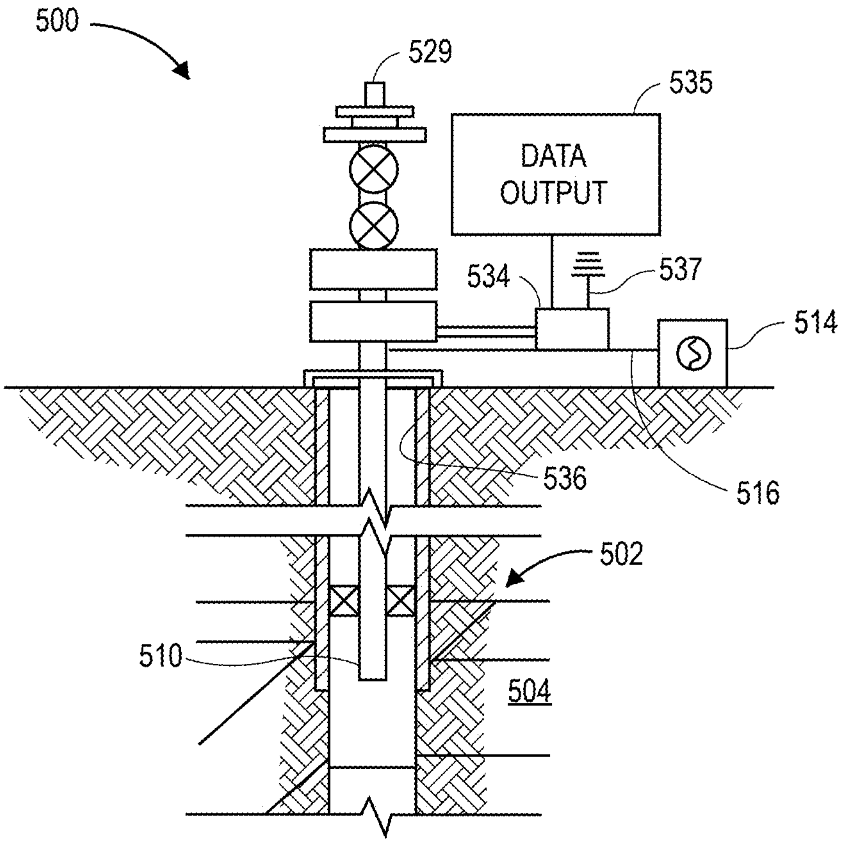
FIG. 1E illustrates a production operation being performed by a production tool deployed from a production unit or Christmas tree and into a completed wellbore for drawing fluid from the downhole reservoirs into surface facilities, according to an embodiment.

FIG. 1E illustrates a production operation being performed by production tool 506.4 deployed from a production unit or Christmas tree 529 and into completed wellbore 536 for drawing fluid from the downhole reservoirs into surface facilities 542. The fluid flows from reservoir 504 through perforations in the casing (not shown) and into production tool 506.4 in wellbore 536 and to surface facilities 542 via gathering network 546.

Sensors (S), such as gauges, may be positioned about oilfield 500 to collect data relating to various field operations as described previously. As shown, the sensor(S) may be positioned in production tool 506.4 or associated equipment, such as Christmas tree 529, gathering network 546, surface facility 542, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1C-1E illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1B-1E are intended to provide a brief description of an example of a field usable with oilfield application frameworks. Part of, or the entirety, of oilfield may be on land, water, and/or sea. Also, while a single field measured at a single location is depicted, oilfield applications may be utilized with any combination of one or more oilfields, one or more processing facilities and one or more wellsites.

Figure 1F:
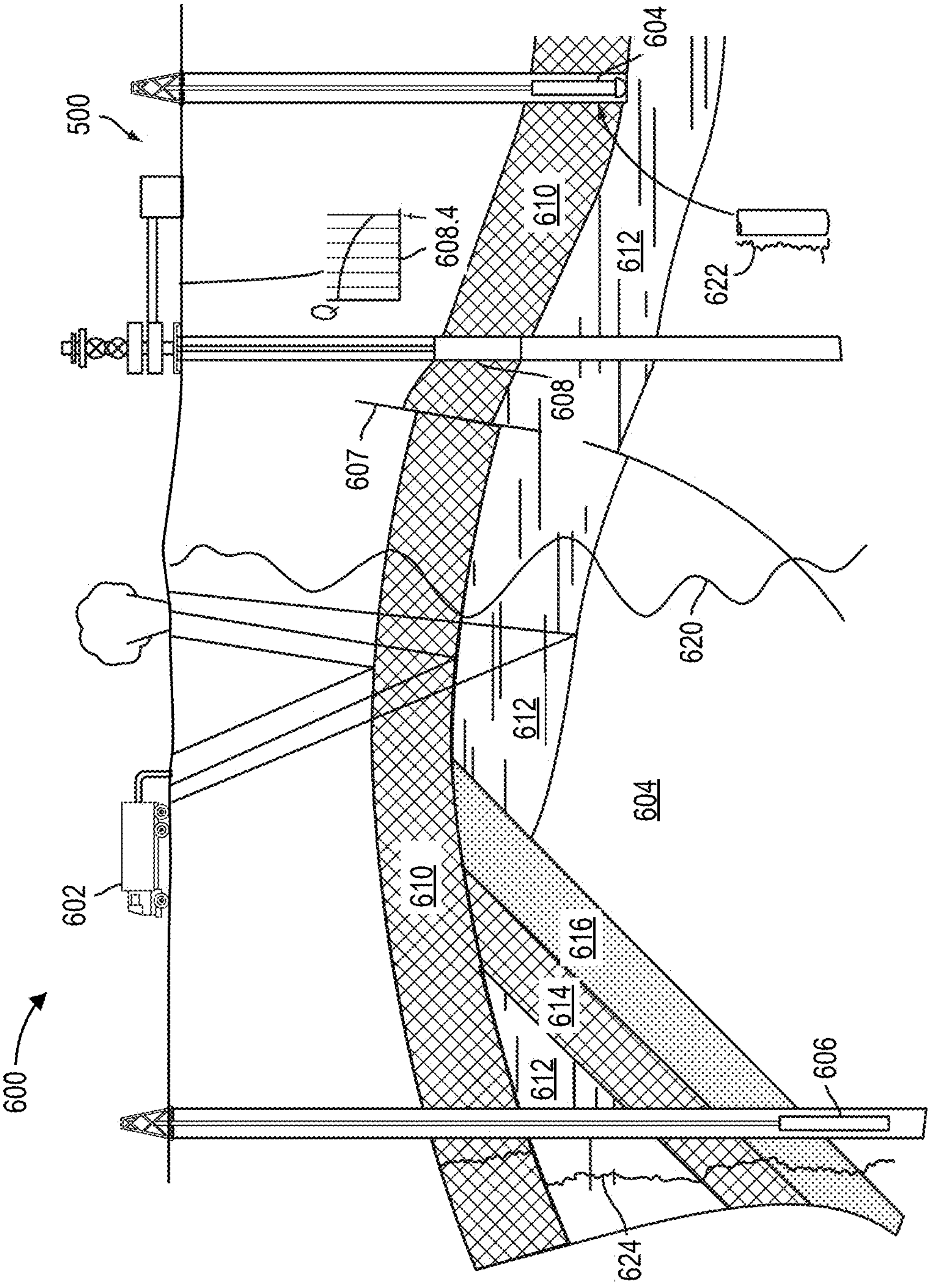
FIG. 1F illustrates a schematic view, partially in cross section of oilfield having data acquisition tools positioned at various locations along oilfield for collecting data of subterranean formation, according to an embodiment.

FIG. 1F illustrates a schematic view, partially in cross section of oilfield 600 having data acquisition tools 602.1, 602.2, 602.3 and 602.4 positioned at various locations along oilfield 600 for collecting data of subterranean formation 604 in accordance with implementations of various technologies and techniques described herein. Data acquisition tools 602.1-602.4 may be the same as data acquisition tools 606.1-606.4 of FIGS. 1B-1E, respectively, or others not depicted. As shown, data acquisition tools 602.1-602.4 generate data plots or measurements 608.1-608.4, respectively. These data plots are depicted along oilfield 600 to demonstrate the data generated by the various operations.

Data plots 608.1-608.3 are examples of static data plots that may be generated by data acquisition tools 602.1-602.3, respectively; however, it should be understood that data plots 608.1-608.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 608.1 is a seismic two-way response over a period of time. Static plot 608.2 is core sample data measured from a core sample of the formation 604. The core sample may be used to provide data, such as a graph of the density, porosity, permeability, or some other physical property of the core sample over the length of the core. Tests for density and viscosity may be performed on the fluids in the core at varying pressures and temperatures. Static data plot 608.3 is a logging trace that provides a resistivity or other measurement of the formation at various depths.

A production decline curve or graph 608.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean formation 604 has a plurality of geological formations 606.1-606.4. As shown, this structure has several formations or layers, including a shale layer 606.1, a carbonate layer 606.2, a shale layer 606.3 and a sand layer 606.4. A fault 607 extends through the shale layer 606.1 and the carbonate layer 606.2. The static data acquisition tools are adapted to take measurements and detect characteristics of the formations.

While a specific subterranean formation with specific geological structures is depicted, it will be appreciated that oilfield 600 may contain a variety of geological structures and/or formations, sometimes having extreme complexity. In some locations, below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 1F, may then be processed and/or evaluated. Seismic data displayed in static data plot 608.1 from data acquisition tool 602.1 is used by a geophysicist to determine characteristics of the subterranean formations and features. The core data shown in static plot 608.2 and/or log data from well log 608.3 are used by a geologist to determine various characteristics of the subterranean formation. The production data from graph 608.4 is used by the reservoir engineer to determine fluid flow reservoir characteristics. The data analyzed by the geologist, geophysicist and the reservoir engineer may be analyzed using modeling techniques.

Figure 1G:
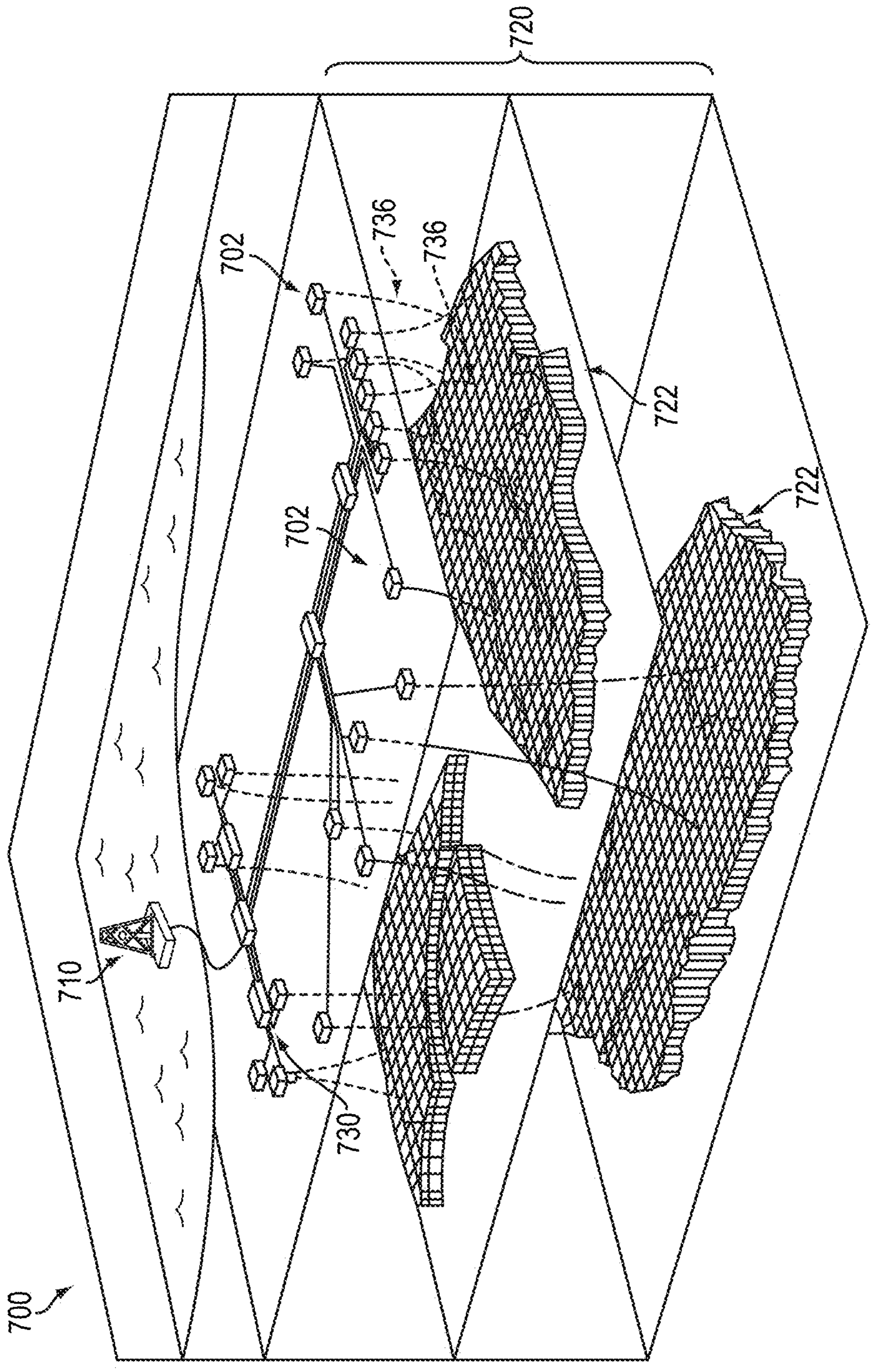
FIG. 1G illustrates an oilfield for performing production operations, according to an embodiment.

FIG. 1G illustrates an oilfield 700 for performing production operations in accordance with implementations of various technologies and techniques described herein. As shown, the oilfield has a plurality of wellsites 702 operatively connected to central processing facility 754. The oilfield configuration of FIG. 1G is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 702 has equipment that forms wellbore 736 into the earth. The wellbores extend through subterranean formations 706 including reservoirs 704. These reservoirs 704 contain fluids, such as hydrocarbons. The wellsites draw fluid from the reservoirs and pass them to the processing facilities via surface networks 744. The surface networks 744 have tubing and control mechanisms for controlling the flow of fluids from the wellsite to processing facility 754.

Figure 1H:
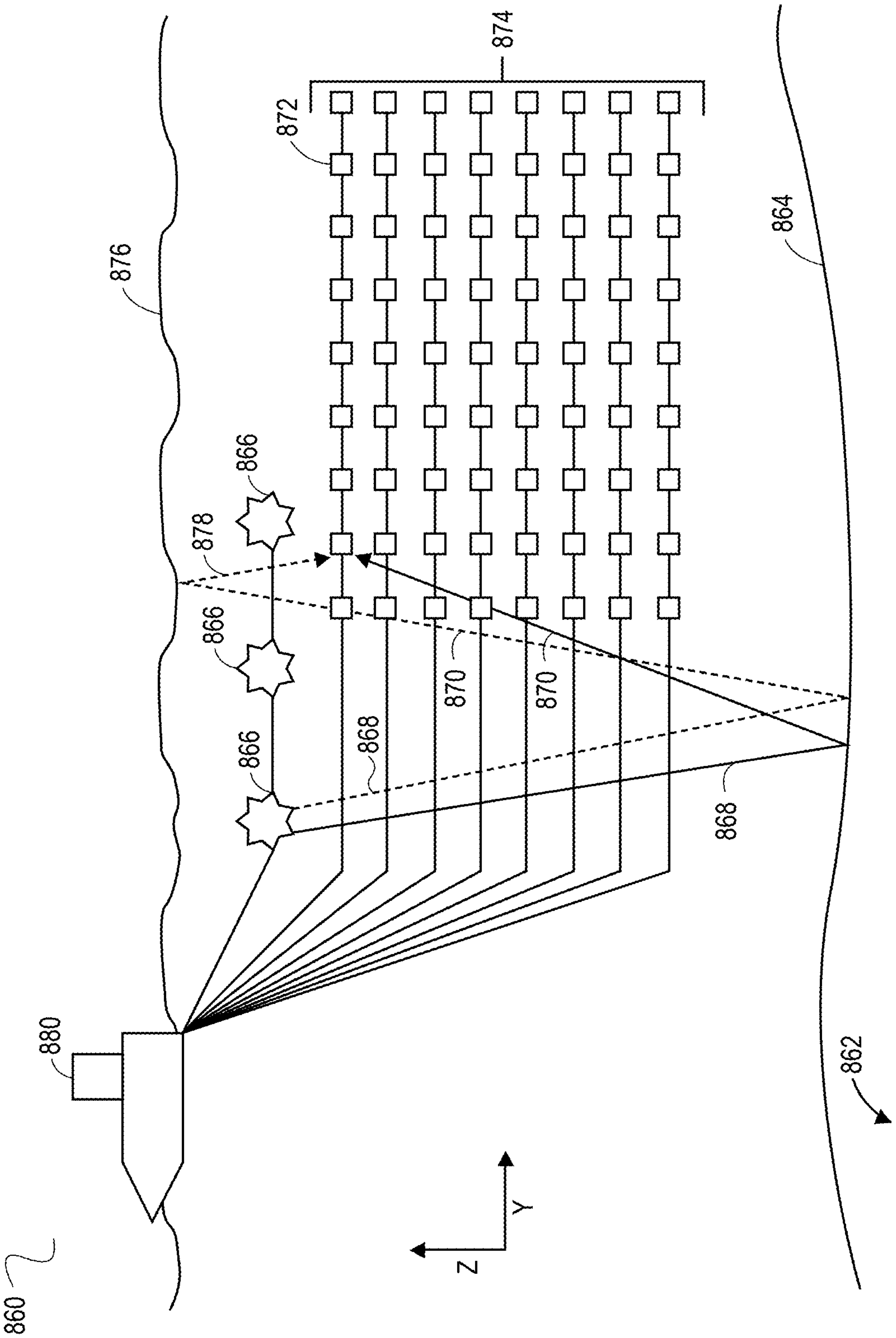
FIG. 1H illustrates a side view of a marine-based survey of a subterranean subsurface, according to an embodiment.

Attention is now directed to FIG. 1H, which illustrates a side view of a marine-based survey 860 of a subterranean subsurface 862 in accordance with one or more implementations of various techniques described herein. Subsurface 862 includes seafloor surface 864. Seismic sources 866 may include marine sources such as vibroseis or airguns, which may propagate seismic waves 868 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 868 may be reflected and converted by seafloor surface 864 (i.e., reflector), and seismic wave reflections 870 may be received by a plurality of seismic receivers 872. Seismic receivers 872 may be disposed on a plurality of streamers (i.e., streamer array 874). The seismic receivers 872 may generate electrical signals representative of the received seismic wave reflections 870. The electrical signals may be embedded with information regarding the subsurface 862 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 870 may travel upward and reach the water/air interface at the water surface 876, a portion of reflections 870 may then reflect downward again (i.e., sea-surface ghost waves 878) and be received by the plurality of seismic receivers 872. The sea-surface ghost waves 878 may be referred to as surface multiples. The point on the water surface 876 at which the wave is reflected downward is generally referred to as the downward reflection point.

The electrical signals may be transmitted to a vessel 880 via transmission cables, wireless communication or the like. The vessel 880 may then transmit the electrical signals to a data processing center. Alternatively, the vessel 880 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may include multiple reflectors, some of which may include dipping events, and may generate multiple reflections (including wave conversion) for receipt by the seismic receivers 872. In one implementation, the seismic data may be processed to generate a seismic image of the subsurface 862.

Marine seismic acquisition systems tow each streamer in streamer array 874 at the same depth (e.g., 5-10 m). However, marine based survey 860 may tow each streamer in streamer array 874 at different depths such that seismic data may be acquired and processed in a manner that avoids the effects of destructive interference due to sea-surface ghost waves. For instance, marine-based survey 860 of FIG. 1H illustrates eight streamers towed by vessel 880 at eight different depths. The depth of each streamer may be controlled and maintained using the birds disposed on each streamer.

Figure 1I:
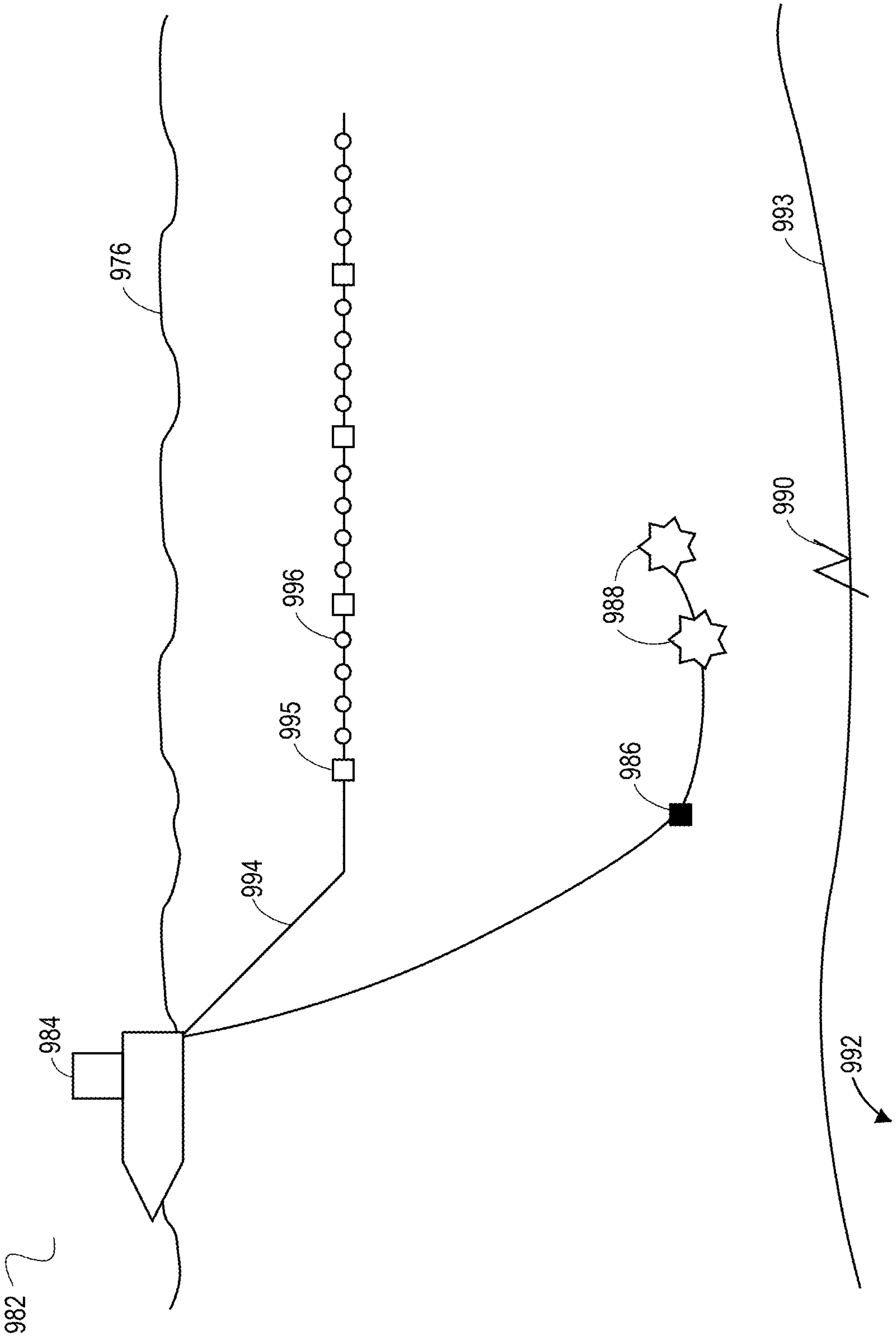
FIG. 1I illustrates a marine electromagnetic survey system, according to an embodiment.

Attention is now directed to FIG. 1I that depicts a marine electromagnetic survey system 982 in accordance with implementations of various technologies described herein. The electromagnetic survey system 982 may use controlled-source electromagnetic (CSEM) survey techniques, but other electromagnetic survey techniques may also be used. Marine electromagnetic surveying may be performed by a survey vessel 984 that moves in a predetermined pattern along the surface 985 of a body of water such as a lake or the ocean. The survey vessel 984 is configured to pull a towfish (an electric source) 986, which is connected to a pair of electrodes 988. During the survey, the vessel may stop and remain stationary for a period of time while obtaining measurements, while in some circumstances, the vessel may remain underway while obtaining measurements.

At the source 986, a controlled electric current may be generated and sent through the electrodes 988 into the seawater. For instance, the electric current generated may be in the range between about 0.01 Hz and about 20 Hz. The current creates an electromagnetic field 990 in the subsurface 992 to be surveyed below the sea floor 993. The electromagnetic field 990 may also be generated by magneto-telluric currents instead of the source 986. The survey vessel 984 may also be configured to tow a sensor cable 994. The sensor cable 994 may be a marine towed cable. The sensor cable 994 may contain sensor housings 995, telemetry units 996, and current sensor electrodes (not illustrated). The sensor housings 995 may contain voltage potential electrodes for measuring the electromagnetic field 990 strength created in the subsurface area 992 during the surveying period. The current sensor electrodes may be used to measure electric field strength in directions transverse to the direction of the sensor cable 994 (the y- and z-directions). The telemetry units 995 may contain circuitry configured to determine the electric field strength using the electric current measurements made by the current sensor electrodes. While a marine-based electromagnetic survey is described in regard to FIG. 1E, a land-based electromagnetic survey may also be used in accordance with implementations of various techniques described herein.

Figure 1J:
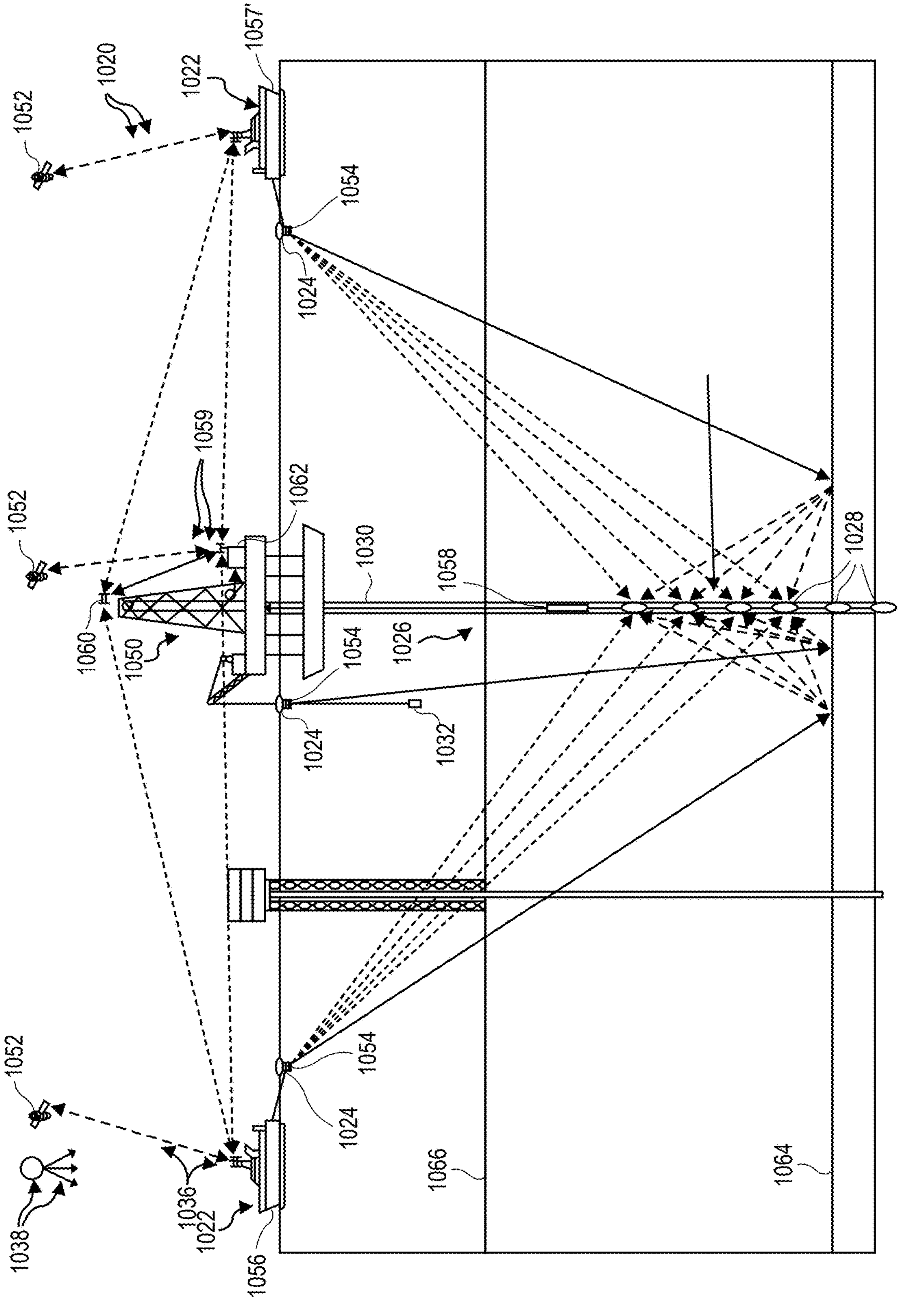
FIG. 1J illustrates a system for performing seismic profiling that can employ simultaneous or near-simultaneous acquisition of seismic data, according to an embodiment.

Attention is now directed to FIG. 1J that depicts an embodiment of seismic system 1020 in which a plurality of tow vessels 1022 is employed to enable seismic profiling, e.g. three-dimensional vertical seismic profiling or rig/offset vertical seismic profiling. In FIG. 1J, a marine system is illustrated as including a rig 1050, a plurality of vessels 1022, and one or more acoustic receivers 1028. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two vessels 1022 are illustrated in FIG. 1J, a single vessel 1022 with multiple source arrays 1024 or multiple vessels 1022 each with single or multiple sources 1024 may be used. In some applications, at least one source/source array 1024 may be located on the rig 1050 as represented by the rig source in FIG. 1J. As the vessels 1022 travel on predetermined or systematic paths, their locations may be recorded through the use of navigation system 1036. In some cases, the navigation system 1036 utilizes a global positioning system (GPS) 1038 to record the position, speed, direction, and other parameters of the tow vessels 1022.

As illustrated, the global positioning system 1038 may utilize or work in cooperation with satellites 1052 which operate on a suitable communication protocol, e.g. VSAT communications. The VSAT communications may be used, among other things, to supplement VHF and UHF communications. The GPS information can be independent of the VSAT communications and may be input to processing system 1046 or other suitable processors to predict the future movement and position of the vessels 1022 based on real-time information. In addition to predicting future movements, the processing system 1046 also can be utilized to provide directions and coordinates as well as to determine initial shot times, as described above. Control system 1034 effectively utilizes processing system 1046 in cooperation with source controller 1042 and synchronization unit 1044 to synchronize the sources 1024 with the downhole data acquisition system 1026.

As illustrated, the one or more vessels 1022 each tow one or more acoustic sources/source arrays 1024. The source arrays 1024 include one or more seismic signal generators 1054, e.g. air guns, configured to create a seismic/sonic disturbance. In the embodiment illustrated, the tow vessels 1022 comprise a master source vessel 1056 (Vessel A) and a slave source vessel 1057 (Vessel B). However, other numbers and arrangements of tow vessels 1022 may be employed to accommodate the parameters of a given seismic profiling application. For example, one source 1024 may be mounted at rig 1050 (see FIG. 1J) or at another suitable location, and both vessels 1022 may serve as slave vessels with respect to the rig source 1024 or with respect to a source at another location.

However, a variety of source arrangements and implementations may be provided as desired for a given application. When utilizing dithered timing between the sources, for example, the master and slave locations of the sources can be adjusted according to the parameters of the specific seismic profiling application. In some applications, one of the source vessels 1022 (e.g. source vessel A in FIG. 1J) may serve as the master source vessel while the other source vessel 1022 serves as the slave source vessel with dithered firing. However, an alternate source vessel 1022 (e.g. source vessel B in FIG. 1J) may serve as the master source vessel while the other source vessel 1022 serves as the slave source vessel with dithered firing.

Similarly, the rig source 1022 may serve as the master source while one of the source vessels 1022 (e.g. vessel A) serves as the slave source vessel with dithered firing. The rig source 1022 also may serve as the master source while the other source vessel 1022 (e.g. vessel B) serves as the slave source vessel with dithered firing. In some applications, the rig source 1022 may serve as the master source while both of the source vessels 1022 serve as slave source vessels each with dithered firings. These and other arrangements may be used in achieving the desired synchronization of sources 1022 with the downhole acquisition system 1026.

The acoustic receivers 1028 of data acquisition system 1026 may be deployed in borehole 1030 via a variety of delivery systems, such as wireline delivery systems, slickline delivery systems, and other suitable delivery systems. Although a single acoustic receiver 1028 could be used in the borehole 1030, the illustrated embodiment comprises a plurality of receivers 1028 that may be located in a variety of positions and orientations. The acoustic receivers 1028 may be configured for sonic and/or seismic reception. Additionally, the acoustic receivers 1028 may be communicatively coupled with processing equipment 1058 located downhole. By way of example, processing equipment 1058 may comprise a telemetry system for transmitting data from acoustic receivers 1028 to additional processing equipment 1059 located at the surface, e.g. on the rig 1050 and/or vessels 1022.

Depending on the specifics of a given data communication system, examples of surface processing equipment 1059 may comprise a radio repeater 1060, an acquisition and logging unit 1062, and a variety of other and/or additional signal transfer components and signal processing components. The radio repeater 1060 along with other components of processing equipment 1059 may be used to communicate signals, e.g. UHF and/or VHF signals, between vessels 1022 and rig 1050 and to enable further communication with downhole data acquisition system 1026.

It should be noted the UHF and VHF signals can be used to supplement each other. In general, the UHF band supports a higher data rate throughput but can be susceptible to obstructions and has less range. The VHF band is less susceptible to obstructions and has increased radio range but its data rate throughput is lower. In FIG. 1J, for example, the VHF communications are illustrated as "punching through" an obstruction in the form of a production platform.

In some applications, the acoustic receivers 1028 are coupled to surface processing equipment 1059 via a hard-wired connection. In other embodiments, wireless or optical connections may be employed. In still other embodiments, combinations of coupling techniques may be employed to relay information received downhole via the acoustic receivers 1028 to an operator and/or control system, e.g. control system 1034, located at least in part at the surface.

In addition to providing raw or processed data uphole to the surface, the coupling system, e.g. downhole processing equipment 1058 and surface processing equipment 1059, may be designed to transmit data or instructions downhole to the acoustic receivers 1028. For example, the surface processing equipment 1059 may comprise synchronization unit 1042 which coordinates the firing of sources 1024, e.g. dithered (delayed) source arrays, with the acoustic receivers 1028 located in borehole 1030. According to one embodiment, the synchronization unit 1042 uses coordinated universal time to ensure accurate timing. In some cases, the coordinated universal time system 1040 is employed in cooperation with global positioning system 1038 to obtain UTC data from the GPS receivers of GPS system 1038.

FIG. 1J illustrates one example of a system for performing seismic profiling that can employ simultaneous or near-simultaneous acquisition of seismic data. By way of example, the seismic profiling may comprise three-dimensional vertical seismic profiling but other applications may utilize rig/offset vertical seismic profiling or seismic profiling employing walkaway lines. An offset source can be provided by a source 1024 located on rig 1050, on a stationary vessel 1022, and/or on another stationary vessel or structure.

As an example, the overall seismic system 1020 may employ various arrangements of sources 1024 on vessels 1022 and/or rig 1050 with each location having at least one source/source array 1024 to generate acoustic source signals. The acoustic receivers 1028 of downhole acquisition system 1026 are configured to receive the source signals, at least some of which are reflected off a reflection boundary 1064 located beneath a sea bottom 1036. The acoustic receivers 1028 generate data streams that are relayed uphole to a suitable processing system, e.g. processing system 1046, via downhole telemetry/processing equipment 1058.

While the acoustic receivers 1028 generate data streams, the navigation system 1036 determines a real-time speed, position, and direction of each vessel 1022 and also estimates initial shot times accomplished via signal generators 1054 of the appropriate source arrays 1024. The source controller 1042 may be part of surface processing equipment 1059 (located on rig 1050, on vessels 1022, or at other suitable locations) and is designed to control firing of the acoustic source signals so that the timing of an additional shot time (e.g. a shot time via slave vessel 1057) is based on the initial shot time (e.g. a shot time via master vessel 1056) plus a dither value.

The synchronization unit 1044 of, for example, surface processing equipment 1059, coordinates the firing of dithered acoustic signals with recording of acoustic signals by the downhole acquisition system 1026. Processor system 1046 is configured to separate a data stream of the initial shot and a data stream of the additional shot via the coherency filter 1048. As discussed above, however, other embodiments may employ pure simultaneous acquisition and/or may not perform separation of the data streams. In such cases, the dither is effectively zero.

After an initial shot time at T=0 (T0) is determined, subsequent firings of acoustic source arrays 1024 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 1024 fire in simultaneous or near-simultaneous patterns reduces the overall amount of time used for three-dimensional vertical seismic profiling source acquisition. This, in turn, reduces rig time. As a result, the overall cost of the seismic operation is reduced, rendering the data intensive process much more accessible.

If the acoustic source arrays used in the seismic data acquisition are widely separated, the difference in move-outs across the acoustic receiver array of the wave fields generated by the acoustic sources 1024 can be sufficient to obtain a clean data image via processing the data without further special considerations. However, even when the acoustic sources 1024 are substantially co-located in time, data acquired by any of the methods involving dithering of the firing times of the individual sources 1024 described herein can be processed to a formation image leaving hardly any artifacts in the final image. This is accomplished by taking advantage of the incoherence of the data generated by one acoustic source 1024 when seen in the reference time of the other acoustic source 1024.

Attention is now directed to methods, techniques, and workflows for processing and/or transforming collected data that are in accordance with some embodiments. Some operations in the processing procedures, methods, techniques, and workflows disclosed herein may be combined and/or the order of some operations may be changed. Those with skill in the art will recognize that in the geosciences and/or other multi-dimensional data processing disciplines, various interpretations, sets of assumptions, and/or domain models such as velocity models, may be refined in an iterative fashion; this concept is applicable to the procedures, methods, techniques, and workflows as discussed herein. This iterative refinement can include use of feedback loops executed on an algorithmic basis, such as at a computing device (e.g., computing system 100, FIG. 1A), and/or through manual control by a user who may make determinations regarding whether a given step, action, template, or model has become sufficiently accurate.

Methods and Systems for Seismic Imaging

The current disclosure relates to embodiments of systems and methods employing a least-squares full-waveform inversion-derived reflectivity (LS-FDR) approach for generating high-fidelity, high-resolution seismic images. Through numerical and field data examples, LS-FDR may produce superior seismic images compared to conventional reverse-time migration (RTM) or least-squares RTM methods. This superiority stems from the iterative nature of the least-squares inversion, which may minimize the discrepancy between modelled and observed data with each iteration. Notably, LS-FDR can effectively utilize primary wavefields and leverage the additional information contained within multiple wavefields. This may result in seismic images that may be characterized by balanced illumination, broader bandwidth, and reduced contamination from multiple crosstalk, ultimately facilitating enhanced reservoir structure interpretation.

Obtaining reliable high-resolution seismic images of the subsurface of a wellsite or field site has been a long-standing goal for the industry. These images may provide the foundation for geological interpretation of reservoirs, allowing for precise definition of their location and capacity. For decades, seismic images have been previously derived through a two-step process during seismic data processing.

According to some embodiments, the method of the present disclosure may include recovering or generating an optimal estimation of the earth model. In certain embodiments, the earth model may be generated using a common image point (CIP)-based tomography workflow as is known. In certain embodiments, an earth model may be derived directly from full-waveform inversion (FWI) workflows, or alternatively through a combination of CIP-based tomography and FWI workflows.

Figure 2:
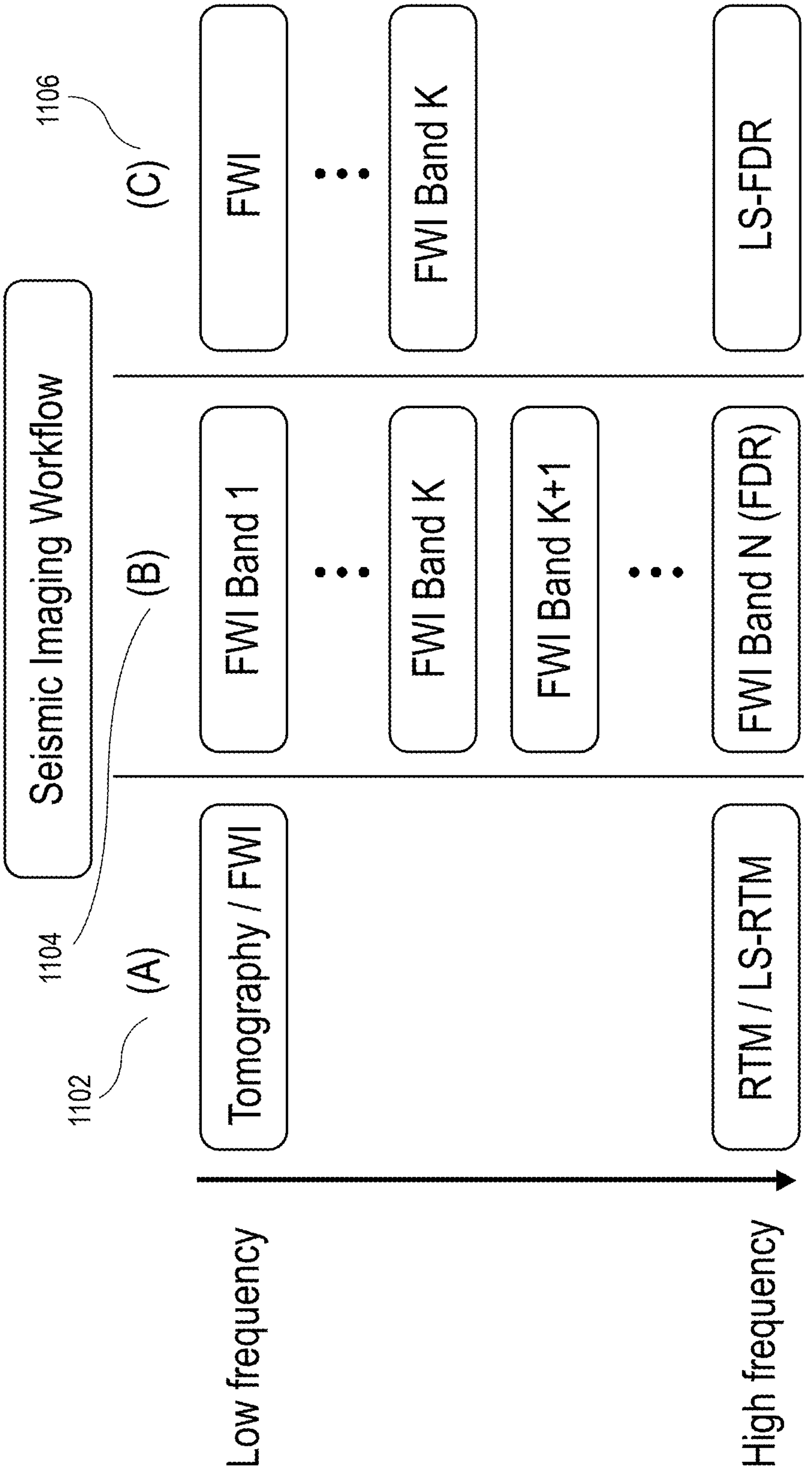
FIG. 2 illustrates a comparison of three different seismic imaging workflows including a LS-FDR approach, according to an embodiment.

According to certain embodiments, after building the earth model, the method may include obtaining a seismic image with a depth migration workflow utilizing a primary-only wavefield. When a high-fidelity seismic image is required, a least-squares migration 1102, either in the data domain or image domain, may be applied as seen in FIG. 2, according to certain embodiments.

FWI has been pushed to higher and higher frequencies, generating unprecedented (high) resolution in earth models. Until recently, as a byproduct of high-frequency FWI velocity models, FWI-derived reflectivity (FDR) volumes can often be produced alongside conventional depth-migrated images. Compared to conventional migration images, FDR volumes that are directly derived from high-resolution FWI velocities often closely resemble least-squares migration images, exhibiting balanced illumination and broader bandwidth, according to certain embodiments. This benefit arises from the iterative nature of FWI, which derives the velocity field from low to high frequencies to match the full bandwidth of the acquired data. According to certain embodiments, a structural interpretation of the subsurface could be achieved in one-step using raw seismic data, eliminating the need for the two-step process involving earth model building followed by primary-only depth migration 1104 seen in FIG. 2. However, generating high-frequency FDR volumes with field data is often limited to small scales or shallow depths due to the computational cost associated with multi-scale FWI across multiple frequency bands, guided by data sampling, to finally reach the target high frequency. Instead, in large-scale field applications, a low-to-mid-frequency FDR volume is often produced alongside an FWI velocity model that may sufficiently characterize the model's kinematics. After obtaining such a "kinematic ready" FWI velocity model, a primary-only migration may be still applied to retrieve a high-frequency seismic image.

According to certain embodiments, the current disclosure provides a least-squares FWI-derived reflectivity (LS-FDR) approach for retrieving high-fidelity, high-resolution seismic images of the subsurface. In certain embodiments, the primary-only migration or least-squares migration used in the second step of conventional imaging may be replaced with a non-linear least-squares full-waveform inversion 1106 as seen in FIG. 2. In certain embodiments, the numerous iterations that may be involved in multi-scale FWI during the high-frequency inversion process may be skipped. Consequently, this may enable significantly reduced computational cost associated with generating high-frequency FDR volumes. In certain embodiments, LS-FDR enables generation of seismic images as compared to conventional migration or least-squares migration approaches, namely through iterative inversion of either velocity or impedance. In certain embodiments, the current LS-FDR method may not be constrained by the primary-only wavefield limitation associated with conventional methods, thereby enabling it to accommodate the full wavefield, including both primary and multiple wavefields. By leveraging the full wavefield, LS-FDR not only benefits from the improved illumination provided by the multiple wavefield but can also significantly simplify the conventional seismic processing workflow. This may be achieved by eliminating the need for lengthy pre-processing steps to prepare demultiple data which are used for primary-only migration.

According to some embodiments, full-waveform inversion (FWI) may employ a low-to-high frequency multi-scale strategy to progressively refine the accuracy and resolution of the reconstructed subsurface model by iteratively minimizing the discrepancy between synthetic and observed seismic data. In certain embodiments, an enhanced template-matching FWI (ETM-FWI) may be used that incorporates both the temporal/spatial misfit (kinematic) and amplitude misfit (dynamic) into a single objective function, as defined by equation 1 below:

$$\mathcal{L}_{etm}[F(m), d] = \frac{1}{2}\left(\|\Delta\tau\|_2^2 + \lambda\|F(m) - d\|_2^2\right) \tag{1}$$

where Δτ represents the measured shift between observed and simulated data through a 2D/3D template-matching process applied to each sample along the time axis, d denotes the observed data, and F(m) represents the forward-simulated data. The hyper-parameter λ serves two purposes: (1) relating the least-squares misfit to the scale of the template-matching misfit and (2) adjusting the focus of the objective function between the template shift (kinematic term) and the least-squares misfit (dynamic term). In equation 1, m(Vp, Ip) denotes the earth model parameter, which encompasses velocity (Vp) and impedance (Ip). The method of the current disclosure may simultaneously invert for both velocity and impedance, with the objective function initially driven by the kinematic term to invert for velocity at lower frequencies and subsequently driven by the dynamic term to invert for impedance at higher frequencies. Once the kinematic component of the velocity model is sufficiently resolved, LS-FDR iterations primarily focus on updating the impedance using near-angle reflection data, according to some embodiments. The data misfit may be minimized through iterative model updates, according to an embodiment. According to Shuey's equation (1985), normal-incidence reflectivity can be approximated as given in equation 2:

$$R_0 \approx \frac{1}{2}\frac{\Delta\rho V_p}{\rho V_p} = \frac{1}{2}\frac{\Delta I_p}{I_p} \tag{2}$$

where ρ denotes the average density, $V_p$ represents the average velocity, $I_p$ indicates the average impedance, and $\Delta I_p$ represents the impedance difference across the interface. As a result, a high-resolution reflectivity volume can be readily extracted after obtaining the FWI model parameters through iterative least-squares inversion.

Figure 3A:
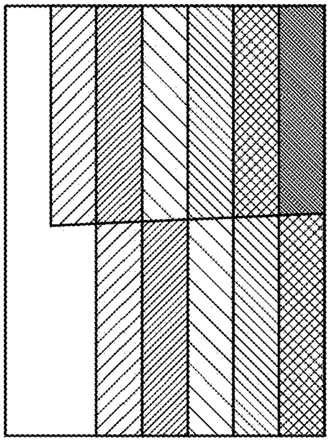
FIGS. 3A-3H illustrate a true impedance for a numerical example, a RTM image of left side shot gathers, a RTM image of right side shot gathers, a RTM image of all shot gathers, a LS-RTM image of all the shot gathers, a LS-FDR image of left side shot gathers, a LS-FDR image of right side shot gathers, and a LS-FDR for all shot gathers, respectively, according to an embodiment.
Figure 3B:
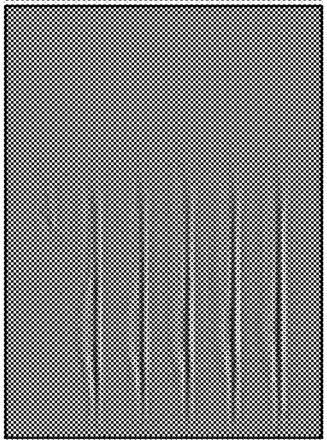
Figure 3C:
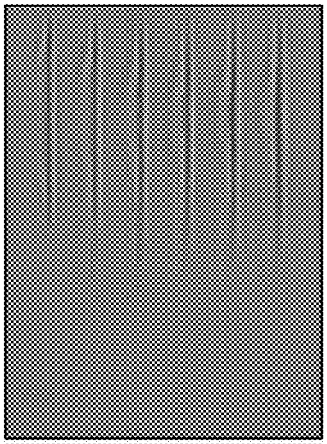
Figure 3D:
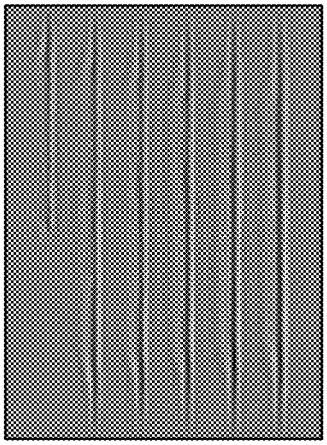
Figure 3E:
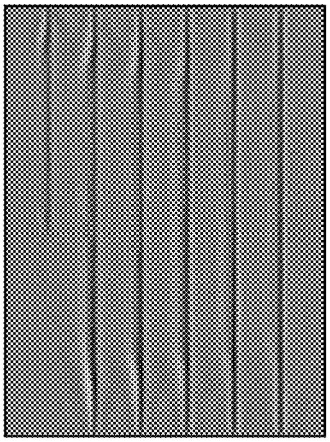

To demonstrate the benefits of LS-FDR over conventional migration and least-squares migration methods, particularly for steeply dipping structures like faults and salt flanks, a numerical example involving a layer model with a steeply dipping fault is described herein. The velocity increases linearly with depth, and sharp density contrasts create corresponding impedance contrasts, as shown in FIG. 3A. A towed-streamer acquisition with sources and receivers at 10 m depth is simulated, a 20 m spacing interval, and a maximum offset of 8 km. FIG. 3B shows the reverse-time migration (RTM) image of the shot gathers acquired at the left side of the model. A positive reflection event at the fault interface is observed, reflecting the positive impedance contrast encountered by the leftward-traveling wavefield. Conversely, FIG. 3C depicts the RTM image of the shot gathers acquired at the right side of the model, revealing a negative reflection event at the fault interface due to the negative impedance contrast experienced by the rightward-traveling wavefield. The stacked RTM image in FIG. 3D suffers from destructive interference due to the conflicting polarities of the fault reflections captured from both sides of the model. This results in a weakened and difficult-to-interpret fault image. The least-squares RTM (LS-RTM) image in FIG. 3E exhibits a similar issue, inheriting the polarity conflict inherent to conventional RTM.

Figure 3F:
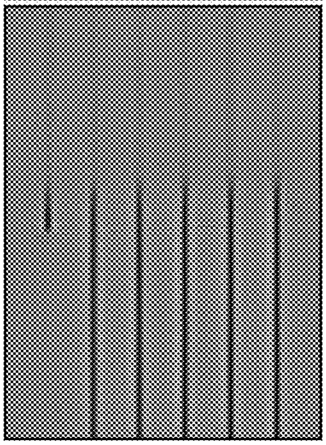
Figure 3G:
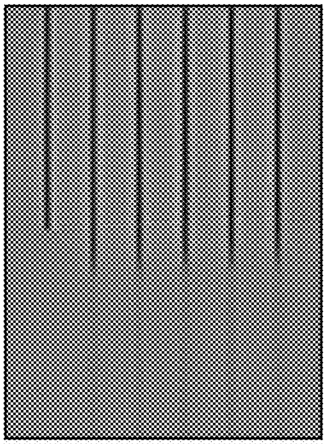
Figure 3H:
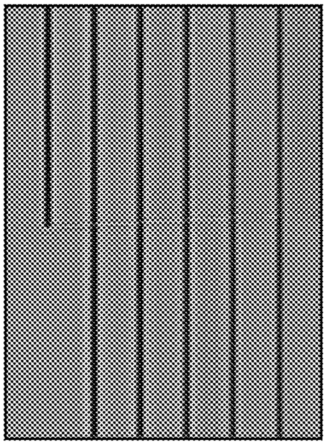

FIGS. 3F-H show the LS-FDR images obtained using the left side of the shot gathers, the right side of the shot gathers, and all the shot gathers, respectively. By leveraging near-angle reflection data dynamics and the impedance-driven nature of LS-FDR, the polarity of the extracted reflectivity remains consistent regardless of the shot source location. This consistency translates into a coherent stacked image shown in FIG. 3H, featuring a significantly stronger response at the steeply dipping fault, facilitating improved interpretation.

Figure 4A:
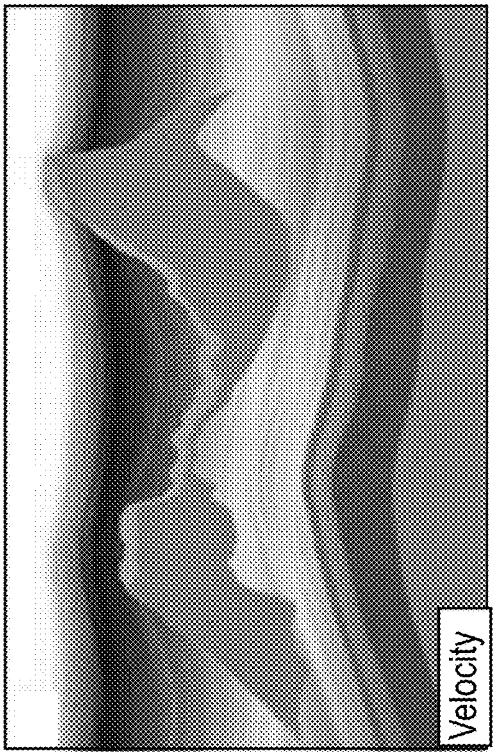
FIGS. 4A-4D illustrate a true velocity for a numeral example, a true density, a RTM image, and a LS-FDR image, respectively, according to an embodiment.
Figure 4B:
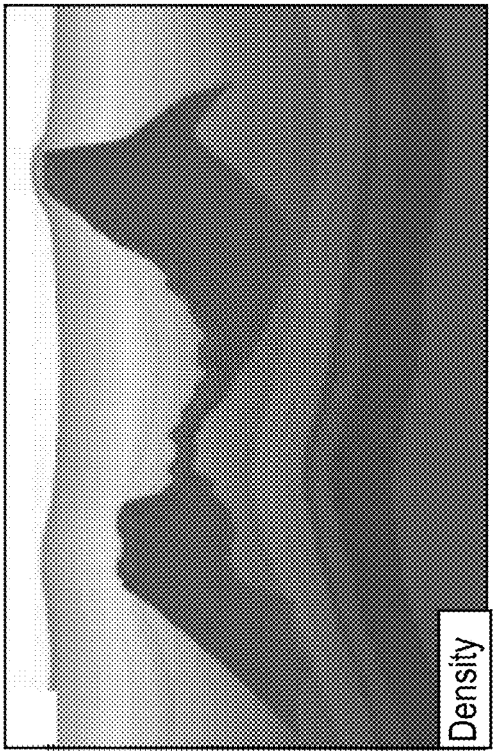
Figure 4C:
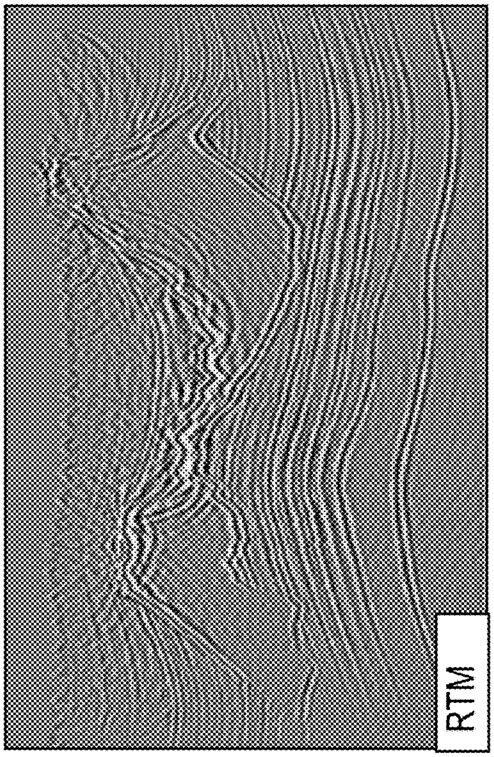
Figure 4D:
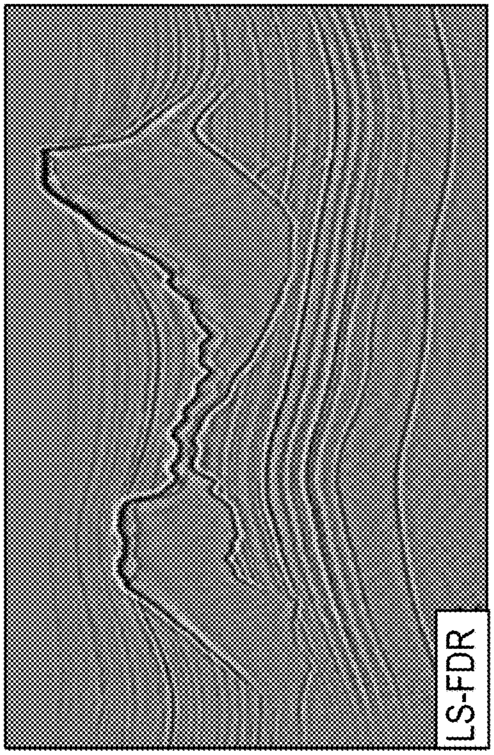

In a further example, the capability of LS-FDR to handle and benefit from the full wavefield of raw data, encompassing both primary and multiple wavefields may be seen. In this embodiment, a sparse node acquisition setup is utilized with nodes spaced 1.2 km apart at the water bottom and sources 50 m apart at 10 m depth. FIGS. 4A-4B depict the true velocity and density models. Applying RTM with primary wavefields, as shown in FIG. 4C, results in noticeable image aliasing at shallow depths due to the sparse node sampling. Conversely, FIG. 4D demonstrates the effectiveness of LS-FDR in handling and benefiting from both the primary and multiple wavefields. Through iterative least-squares inversion aimed at fitting all available data, LS-FDR produces an image with significantly reduced noise and broader bandwidth. This translates into a sharper and more coherent LS-FDR image, as shown in FIG. 4D, exhibiting improved resolution at shallow depths and throughout the deeper sections.

Figure 5A:
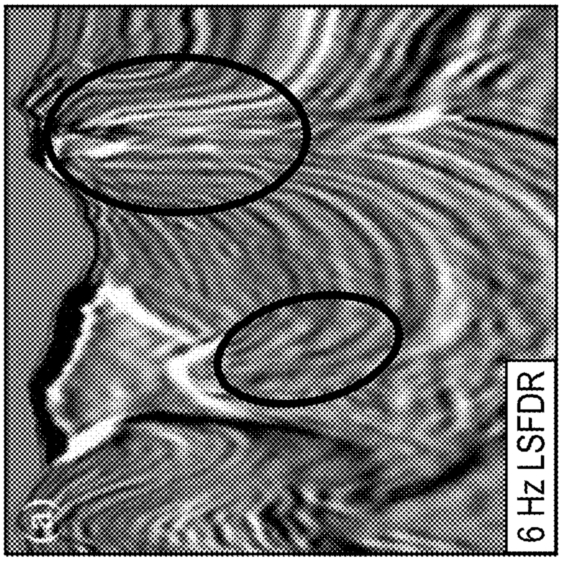
FIGS. 5A-5C illustrate a 6 Hz FDR image of acquired field data, a 15 Hz RTM image of the acquired field data, and a 15 Hz LS-FDR image of the acquired field data, respectively, according to an embodiment.
Figure 5B:
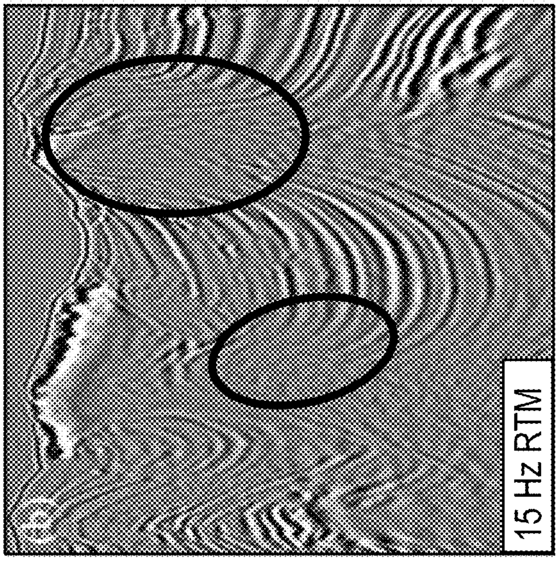
Figure 5C:
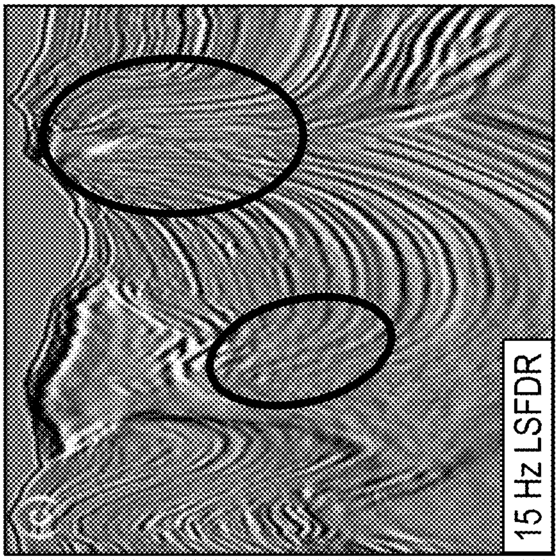

According to an embodiment, the field data example is located in the Campeche basin, deep-water southern Gulf of Mexico. The region is known for its intricate salt structures, as depicted in FIG. 5. The towed-streamer data may be acquired with a maximum offset reaching 9 km. After obtaining a velocity model at a maximum frequency of 6 Hz using ETM-FWI, an FDR volume was generated, shown in FIG. 5A. Due to the limited frequency, the 6 Hz FDR volume lacks resolution. Subsequently, both a 15 Hz RTM image and a 15 Hz LS-FDR image were produced using the 6 Hz velocity model, as illustrated in FIGS. 5B-5C.

Compared to the RTM image, the LS-FDR image may offer significantly improved resolution and bandwidth, extending not only at shallow depths but also penetrating the complex subsalt region. The iterative nature of LS-FDR effectively compensates for transmission loss and uneven illumination, enabling reconstruction of far more coherent and continuous reflections within the subsalt area. Consequently, this leads to an enhanced reservoir interpretation.

Exemplary Method

Figure 6:
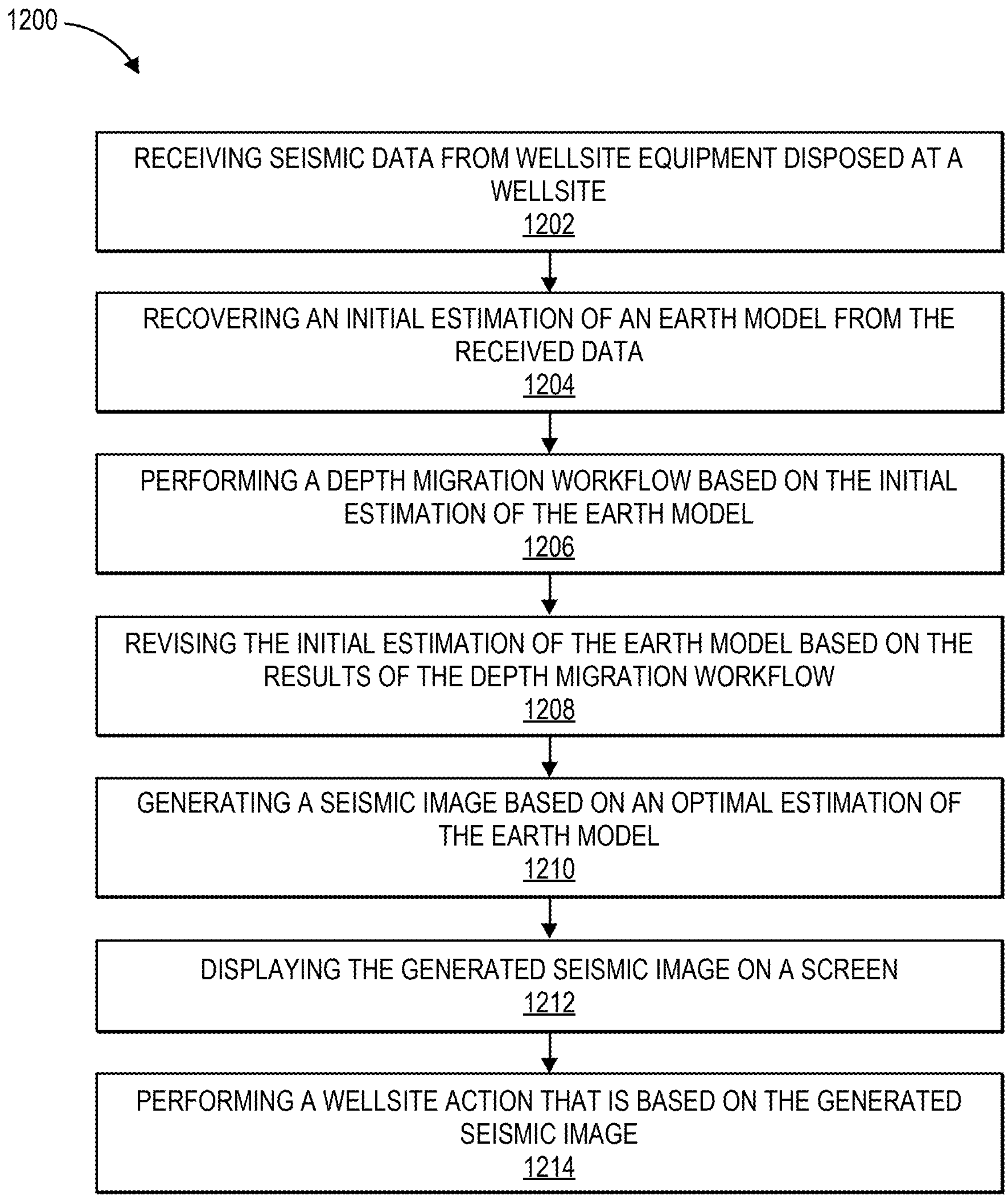
FIG. 6 illustrates a flowchart of a method for producing a high-fidelity, high-resolution seismic image of a subsurface of a wellsite, according to an embodiment.

FIG. 6 illustrates a flowchart for a method 1200 for producing a high-fidelity, high-resolution seismic image of a subsurface of a wellsite. In certain embodiments, the method includes receiving seismic data from wellsite equipment disposed at a wellsite, as at 1202.

According to certain embodiments, the method 1200 includes recovering an initial estimation of an earth model from the received data, as at 1204.

According to certain embodiments, the method 1200 includes performing a depth migration workflow that is based on the initial estimation of the earth model, as at 1206. In certain embodiments, the depth migration workflow may be a least-squares FWI-derived reflectively (LS-FDR) workflow. The LS-FDR workflow itself may further include utilizing a primary-only wavefield, multiple wavefields, or a combination thereof.

According to certain embodiments, the method 1200 includes revising the initial estimation of the earth model based on the results of the depth migration workflow to produce an optimal estimation of the earth model, as at 1208. In certain embodiments, the initial estimation of the earth model is revised repeatedly using the LS-FDR workflow.

According to certain embodiments, the method 1200 includes generating a seismic image from the optimal estimation of the earth model, as at 1210.

According to certain embodiments, the method 1200 includes displaying the generated seismic image on a screen, as at 1212.

According to certain embodiments, the method 1200 includes performing a wellsite action based on the generated seismic image, as at 1214. In certain embodiments, performing the wellsite action includes generating or transmitting a signal that instructs or causes an action to occur, wherein the action comprises a physical action, and wherein the physical action comprises selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, deciding to stop drilling and pull the downhole equipment up before causing a twist-off, or a combination thereof.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MRI and the like for human tissue; radar, sonar, and LIDAR imaging techniques; mining area surveying and monitoring, oceanographic surveying and monitoring, and other appropriate multi-dimensional imaging problems.

Many examples of equations and mathematical expressions have been provided in this disclosure. But those with skill in the art will appreciate that variations of these expressions and equations, alternative forms of these expressions and equations, and related expressions and equations that can be derived from the example equations and expressions provided herein may also be successfully used to perform the methods, techniques, and workflows related to the embodiments disclosed herein.

While any discussion of or citation to related art in this disclosure may or may not include some prior art references, applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to explain the principles of the present disclosure and its practical applications, to thereby enable others skilled in the art to utilize the present disclosure and various embodiments with various modifications as are suited to the particular use contemplated.

Those with skill in the art will appreciate that while the quoted sections of the article above that are provided for illustrative purposes include terms that could be interpreted as potentially absolute or requiring a given thing (including without limitation "exactly", "exact", "only", "key", "important", "requires", "all", "each", "must", "always", etc.), the various systems, methods, processing procedures, techniques, and workflows disclosed herein are not to be understood as limited by the use of these terms In some embodiments, the multi-dimensional region of interest is selected from the group consisting of a subterranean region, human tissue, plant tissue, animal tissue, solid volumes, substantially solid volumes, volumes of liquid, volumes of gas, volumes of plasma, and volumes of space near and/or outside the atmosphere of a planet, asteroid, comet, moon, or other body.

In some embodiments, the multi-dimensional region of interest includes one or more volume types selected from the group consisting of a subterranean region, human tissue, plant tissue, animal tissue, solid volumes, substantially solid volumes, volumes of liquid, volumes of air, volumes of plasma, and volumes of space near and/or or outside the atmosphere of a planet, asteroid, comet, moon, or other body.

What is claimed is:

1. A method for producing a high-fidelity, high-resolution seismic image of a subsurface of a wellsite, the method comprising:
   - receiving seismic data from wellsite equipment disposed at the wellsite;
   - recovering an initial estimation of an earth model based on the seismic data;
   - performing a depth migration workflow based on the initial estimation of the earth model, wherein the depth migration workflow is a least-squares full-waveform inversion (FWI)-derived reflectively (LS-FDR) workflow;
   - revising the initial estimation of the earth model based on results of the depth migration workflow to produce an updated estimation of the earth model;
   - generating the seismic image from the updated estimation of the earth model;
   - displaying the seismic image on a screen; and
   - performing a wellsite action based on the seismic image, wherein performing the wellsite action comprises generating or transmitting a signal that instructs or causes an action to occur, wherein the action comprises a physical action, and wherein the physical action comprises selecting where to drill a wellbore in a subsurface formation, drilling the wellbore, varying a trajectory of the wellbore, varying a weight or torque on a drill bit that is drilling the wellbore, varying a rate or concentration of a fluid being pumped into the wellbore, deciding to stop drilling and pull a downhole equipment up before causing a twist-off, or a combination thereof.

2. The method of claim 1, wherein the depth migration workflow comprises utilizing a primary-only wavefield, multiple wavefields, or a combination thereof.

3. The method of claim 1, wherein revising the initial estimation of the earth model based on the results of the depth migration workflow comprises detecting a presence of any discrepancies between the initial estimation of the earth model and the seismic data.

4. The method of claim 3, further comprising minimizing any detected discrepancies between the initial estimation of the earth model and the received seismic data to produce the updated estimation of the earth model.

5. The method of claim 4, wherein minimizing any detected discrepancies between the initial estimation of the earth model and the seismic data comprises iterating a least-squares inversion to produce the updated estimation of the earth model.

6. The method of claim 4, wherein minimizing any detected discrepancies between the initial estimation of the earth model and the seismic data comprises utilizing an enhanced template-matching full-waveform inversion (ETM-FWI) that incorporates both a temporal/spatial misfit and an amplitude misfit into a single objective function.

7. The method of claim 6, wherein the ETM-FWI is based on a measured shift between observed and simulated data through a 2D/3D template-matching process applied to a time axis, the received seismic data, the initial estimation of the earth model, a least-squares misfit, and a parameter of the earth model which comprises velocity and impedance.

8. The method of claim 4, wherein minimizing any detected discrepancies between the initial estimation of the earth model and the seismic data comprises updating an impedance of the initial estimation of the earth model using near-angle reflection data of the seismic data.

9. The method of claim 8, wherein updating an impedance of the initial estimation of the earth model using near-angle reflection data of the received seismic data is based on an average density, an average velocity, an average impedance, and an impedance difference across an interface.

10. A computing system, comprising:
   - one or more processors; and
   - a memory system comprising one or more non-transitory computer-readable media storing instructions that, when executed by at least one of the one or more processors, cause the computing system to perform operations, the operations comprising:
     - receiving seismic data from wellsite equipment disposed at a wellsite;
     - recovering an initial estimation of an earth model based on the seismic data;
     - performing a depth migration workflow based on the initial estimation of the earth model;
     - revising the initial estimation of the earth model based on the results of depth migration workflow to produce an updated estimation of the earth model, wherein revising the initial estimation of the earth model based on the results of the depth migration workflow to produce the updated estimation of the earth model comprises compensating for transmission loss and even illumination within the seismic data;
     - generating a seismic image from an optimal estimation of the earth model;
     - displaying the seismic image on a screen related to the wellsite; and
     - performing a wellsite action based on the seismic image, wherein performing the wellsite action comprises generating or transmitting a signal that instructs or causes an action to occur, wherein the action comprises a physical action, and wherein the physical action comprises selecting where to drill a wellbore in a subsurface formation, drilling the wellbore, varying a trajectory of the wellbore, varying a weight or torque on a drill bit that is drilling the wellbore, varying a rate or concentration of a fluid being pumped into the wellbore, deciding to stop drilling and pull a downhole equipment up before causing a twist-off, or a combination thereof.

11. The computing system of claim 10, wherein the wellsite equipment comprises a towed streamer array comprising a plurality of sensors communicated to the one or more processors.

12. The computing system of claim 10, wherein the wellsite equipment comprises a plurality of nodes disposed over the wellsite and a plurality of sources disposed at a depth relative to the plurality of nodes.

13. The computing system of claim 10, further comprising:
   - continuously receiving seismic data from the wellsite equipment disposed at the wellsite; and
   - performing additional depth migration workflows corresponding to the continuously received seismic data.

14. A non-transitory computer-readable medium storing instructions that, when executed by one or more processors of a computing system, cause the computing system to perform operations, the operations comprising:
   - receiving seismic data from wellsite equipment disposed at a wellsite;

recovering an initial estimation of an earth model based on the seismic data;

performing a depth migration workflow based on the initial estimation of the earth model, wherein the depth migration workflow is a least-squares full-waveform inversion (FWI)-derived reflectively (LS-FDR) workflow, wherein the LS-FDR workflow comprises utilizing a primary-only wavefield, multiple wavefields, or a combination thereof;

revising the initial estimation of the earth model based on results of the depth migration workflow to produce an updated estimation of the earth model, wherein the initial estimation of the earth model is revised repeatedly using the LS-FDR workflow;

generating a seismic image from an optimal estimation of the earth model;

displaying the seismic image on a screen; and performing a wellsite action based on the seismic image, wherein performing the wellsite action comprises generating or transmitting a signal that instructs or causes an action to occur, wherein the action comprises a physical action, and wherein the physical action comprises selecting where to drill a wellbore in a subsurface formation, drilling the wellbore, varying a trajectory of the wellbore, varying a weight or torque on a drill bit that is drilling the wellbore, varying a rate or concentration of a fluid being pumped into the wellbore, deciding to stop drilling and pull a downhole equipment up before causing a twist-off, or a combination thereof.

* * * * *